US008412139B2

(12) United States Patent
Park et al.

(10) Patent No.: US 8,412,139 B2
(45) Date of Patent: Apr. 2, 2013

(54) METHODS OF RECEIVING MULTIPLE CARRIERS USING DIFFERENT RF MIXER FREQUENCIES AND RELATED COMMUNICATIONS DEVICES AND RECEIVERS

(75) Inventors: Chester Park, Santa Clara, CA (US); Lars Sundström, Lund (SE); Ali S. Khayrallah, Mountain View, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 270 days.

(21) Appl. No.: 12/987,841

(22) Filed: Jan. 10, 2011

(65) Prior Publication Data

US 2012/0177147 A1    Jul. 12, 2012

(51) Int. Cl.
*H04B 1/16* (2006.01)
*H04K 3/00* (2006.01)
(52) U.S. Cl. .................. 455/207; 455/209; 455/553.1
(58) Field of Classification Search .......... 455/131–133, 455/207, 209, 313–315, 552.1, 553.1; 370/208
See application file for complete search history.

(56) References Cited

U.S. PATENT DOCUMENTS

| 4,340,975 | A | | 7/1982 | Onishi et al. | |
|---|---|---|---|---|---|
| 5,745,846 | A | * | 4/1998 | Myer et al. | 455/209 |
| 2002/0127982 | A1 | * | 9/2002 | Haapoja et al. | 455/130 |

FOREIGN PATENT DOCUMENTS

JP    2010 088089 A    4/2010

OTHER PUBLICATIONS

Yuan G. et al. "Carrier aggregation for LTE-Advanced mobile communication systems", Communications Magazine, IEEE, vol. 48 , Issue: 2, Feb. 2010, pp. 88-93.
Springer A. et al. "RF system concepts for highly integrated RFICs for W-CDMA mobile radio terminals," Microwave Theory and Techniques, IEEE Transactions on, vol. 50, No. 1, pp. 254-267, Jan. 2002.
Tarighat A. et al. "Compensation schemes and performance analysis of IQ imbalances in OFDM receivers", IEEE Trans. Signal Processing, vol. 53, No. 8, pp. 3257-3268, Aug. 2005.
Weldon J. A. et al. "A 1.75-GHz highly integrated narrow-band CMOS transmitter with harmonic-rejection mixers", IEEE JSSC, vol. 36, pp. 2003-2015, Dec. 2001.

* cited by examiner

*Primary Examiner* — Lee Nguyen

(57) ABSTRACT

Methods may be provided to simultaneously receive first and second RF (radio frequency) carriers over respective first and second RF carrier frequencies. More particularly, the first and second RF carriers may be provided at an RF mixer stage. During a first time period, the first and second RF carriers may be down converted through the RF mixer stage using a first RF mixer frequency to generate first downconverted signals, and the first downconverted signals may be processed to provide first and second DC carriers corresponding to the first and second RF earners. During a second time period, the first and second RF carriers may be downconverted through the RF mixer stage using a second RF mixer frequency to generate second downconverted signals with the first and second RF mixer frequencies being different, and the second downconverted signals may be processed to provide the first and second DC carriers corresponding to the first and second RF carriers. Related devices are also discussed.

20 Claims, 6 Drawing Sheets

METHODS OF RECEIVING MULTIPLE CARRIERS USING DIFFERENT RF MIXER FREQUENCIES AND RELATED COMMUNICATIONS DEVICES AND RECEIVERS

TECHNICAL FIELD

The present disclosure is directed to wireless communications and, more particularly, to multi-carrier reception methods and related receivers.

BACKGROUND

In a typical cellular radio system, user equipment unit nodes (UEs) (also known as wireless terminals or mobile stations) communicate via a radio access network (RAN) with one or more core networks. The RAN covers a geographical area which is divided into cell areas, with each cell area being served by a RAN node, e.g., a radio base station (BS), which in some networks is also called a "NodeB" or enhanced NodeB "eNodeB." A cell area is a geographical area where radio coverage is provided by the base station equipment at a base station site. The base stations communicate through radio communication channels with UEs within range of the base stations.

Wireless communication systems are often characterized by time-varying interference environment. Cognitive radio as a new paradigm uses knowledge of interference conditions to improve aspects of radio performance such as throughput or coverage.

In parallel with development of cognitive radio, there has been a growing demand to receive multiple carriers simultaneously. Carrier aggregation (CA) is an example of multiple carrier reception where multiple carriers are transmitted and received from a single UE. Carrier aggregation is being considered for use in the 3GPP. In particular, the LTE-Advanced standard considers intra-band non-contiguous carrier aggregation where multiple carriers are separately placed within a band. Software defined radio is another example where multiple wireless systems are supported by a single UE simultaneously. A challenge of multiple carrier reception is to share as much radio hardware as possible between reception/transmission chains for the different carriers, for example, to reduce power consumption and/or hardware cost.

As a radio architecture of a UE supporting multiple carrier reception, a direct conversion receiver [DCR] or a double conversion receiver may be used. These two radio architectures may have different advantages and disadvantages. A double conversion receiver may enable cost-efficient and hardware-efficient implementation, because multiple carriers may share the RF front-end (e.g., low-noise amplifier and mixers) and (portions of) IF mixing stages. A double conversion receiver, however, may be more susceptible to IQ imbalance and/or harmonic mixing. A double conversion receiver may thus require more careful radio design.

Both IQ imbalance and harmonic mixing may cause an undesired signal(s) to interfere with a desired signal(s). Interference due to IQ imbalance and/or harmonic mixing, however, may involve different signals, and if they involve the same signal, the resulting interference level may be different. IQ imbalance may cause the image signal (i.e., a signal separated from the RF mixer frequency by the IF mixer frequency on the opposite side of the desired signal) to interfere with the desired signal. The interference level may be determined by the image rejection ratio, which is given as a function of gain and phase imbalance of the RF mixing stage. On the other hand, harmonic mixing may involve primarily the odd harmonics (i.e., the signals distant from the RF mixer frequency by odd multiples of the IF mixer frequency), and even harmonics to a much lesser extent. The interference level may be determined by a harmonic rejection ratio, which is determined by the architecture of harmonic rejection mixer (and also the relevant gain and phase unbalance). Accordingly, the SINR of the desired signal may depend on radio parameters (e.g., image rejection ratio, harmonic rejection ratio etc.) as well as interference conditions.

One approach to mitigating effects of interference is to select radio frequency carriers with higher SINR (Signal-to-Interference plus Noise-Ratio) to improve reception. The receiver measures SINRs of all available channels and feeds the information back to the transmitter. The transmitter uses the RF carriers with higher SINR, based on the information from the receiver. This is often referred to as cognitive radio in the literature, and it can be seen as an adaptation based on interference condition, implementation, however, requires additional signaling overhead (to communicate SINR information and channel selection), and carriers with desirable SINR may not always be available.

SUMMARY

According to some embodiments, first and second radio frequency (RF) carriers may be simultaneously received over respective first and second RF carrier frequencies. More particularly, the first and second RF carriers may be received at an RF mixer stage. During a first time period, the first and second RF carriers may be downconverted through the RF mixer stage using a first RF mixer frequency to generate first downconverted signals, and the first downconverted signals may be processed to provide first and second DC carriers corresponding to the first and second RF carriers. During a second time period, the first and second RF carriers may be downconverted through the RF mixer stage using a second RF mixer frequency to generate second downconverted signals (with the first and second RF mixer frequencies being different), and the second downconverted signals may be processed to provide the first and second DC carriers corresponding to the first and second RF carriers.

By providing a multiple carrier receiver structure that is reconfigurable (e.g., using different RF mixer frequencies at different times) while receiving multiple RF carriers (e.g., RF component carriers) over respective unchanging RF carrier frequencies, the receiver can select a given configuration to match current interference characteristics for the RF carriers being received. Accordingly, the receiver (e.g., a receiver of a mobile terminal) can adapt its configuration to improve reception without transmitting a request to the transmitting device (e.g., a fixed base station) to change RF carrier frequencies.

Each of the first and second RF mixer frequencies may be between the first and second RF carrier frequencies, equal to the first RF carrier frequency, or equal to the second RF carrier frequency. For example, the first RF mixer frequency may be between the first and second RF carrier frequencies, and the second RF mixer frequency may be equal to the first RF carrier frequency.

Processing the first downconverted signals during the first time period may include downconverting the first downconverted signals through an IF mixer stage using a first intermediate frequency (IF) mixer frequency to generate the first and second DC carriers at DC. Processing the second downconverted signals during the second time period may include downconverting the second downconverted signals through the IF mixer stage using a second intermediate frequency (IF) mixer frequency to generate the second DC carrier at DC corresponding to the second RF carrier, and processing the second downconverted signals without IF mixing to generate the first DC carrier at DC corresponding to the first RF carrier. More particularly, the first RF mixer frequency may be equal to an average of the first and second RF carrier frequencies, the second RF mixer frequency is equal to the first RF carrier frequency of the first RF carrier, the first IF mixer frequency may be equal to half of a difference between the first and second RF carrier frequencies of the first and second RF carriers, and the second. IF mixer frequency may be equal to a difference between the first and second RF carrier frequencies of the first and second RF carriers. As used herein, the term average may refer to a midpoint between the first and second RF carrier frequencies such that the first RF mixer frequency is equidistant from the first and second RF carrier frequencies. Accordingly, each of the first RF carrier frequency, the second RF carrier frequency, and the first RF mixer frequency ((equal to the average of the first and second RF carrier frequencies)) may remain fixed (or unchanged) over the first time period.

During a third time period, the first and second RF carriers may be downconverted through the RF mixer stage using a third RF mixer frequency to generate third downconverted signals, and the thud downconverted signals may be processed to provide the first and second DC carriers corresponding to the first and second RF carriers.

Processing the first downconverted signals during the first time period may include downconverting the first downconverted signals through an IF mixer stage using a first intermediate frequency (IF) mixer frequency to generate the first and second DC carriers at DC. Processing the second downconverted signals during the second time period, may include downconverting the second, downconverted signals through the IF mixer stage using a second intermediate frequency (IF) mixer frequency to generate the second DC carrier at DC corresponding to the second RF carrier, and processing the second downconverted signals without IF mixing to generate the first DC carrier at DC corresponding to the first RF carrier. Processing the third downconverted signals during the third time period may include downconverting the third, downconverted signals through the IF mixer stage using a third intermediate frequency (IF) mixer frequency to generate the first DC carrier at DC corresponding to the first RF carrier, and processing the third downconverted signals without IF mixing to generate the second DC carrier at DC corresponding to the second RF carrier. The first RF mixer frequency may be equal to an average of the first and second RF carrier frequencies of the first and second RF carriers, the second RF mixer frequency may be equal to the first RF carrier frequency of the first RF carrier, and the third RF mixer frequency may be equal to the second RF carrier frequency of the second RF carrier. The first IF mixer frequency may be equal to half of a difference between the first and second RF carrier frequencies of the first and second RF carriers, and the second, and third IF mixer frequencies may be equal to differences between the first and second RF carrier frequencies of the first and second RF carriers.

The first and second DC carriers may be converted from analog signals to digital signals, and the digital signals may be processed to generate data streams corresponding to the first and second RF carriers. Accordingly, information may be provided through a user interface responsive to the data streams.

Downconverting during the first time period, may include downconverting using the first RF mixer frequency responsive to estimating noise and/or interference for the first time period, and downconverting during the second time period may include downconverting using the second RF mixer frequency responsive to estimating noise and/or interference for the second time period different titan the noise and/or interference for the his; period. Accordingly, reception may be reconfigured responsive to changing noise and/or interference conditions.

More particularly, downconverting during the first time period using the first RF mixer frequency may include providing an estimate of noise and/or interference for the first time period, calculating first performance metrics for downconverting and processing the first and second RF carriers using the first and second RF mixer frequencies responsive to the estimate of noise and/or interference for the first time period, and selecting the first RF mixer frequency responsive to the first performance metrics. Similarly, downconverting during die second time period using the second RF mixer frequency may include providing an estimate of noise and/or interference for the second tune period, calculating second performance metrics for downconverting and processing the first and second RF carriers using the first and second RF mixer frequencies responsive to the estimate of noise and/or interference for the second time period, and selecting the second RF mixer frequency responsive to the second performance metrics.

According to other embodiments, a communications device may be configured to simultaneously receive a first and second radio frequency (RF) carriers over respective first and second RF carrier frequencies. An RF mixer stage may be configured to downconvert the first and second RF carriers using a first RF mixer frequency during a first time period, to generate first downconverted signals, and to downconvert the first and second RF carriers using a second RF mixer frequency during a second time period to generate second downconverted signals with the first and second RF mixer frequencies being different. An intermediate frequency (IF) mixer stage may be configured to process the first downconverted signals during the first time period to provide first and second DC carriers corresponding to the first and second RF carriers during the first time period, and to process the second, downconverted signals during the second time period to provide the first and second DC carriers corresponding to the first and second RF carriers during the second time period.

Each of the first and second RF mixer frequencies may be between the first and second RF carrier frequencies, may be equal to the first RF carrier frequency, or may be equal to the second RF carrier frequency. For example, the first RF mixer frequency may be between the first and second. RF carrier frequencies, and the second. RF mixer frequency may be equal to the first RF carrier frequency.

The IF mixer stage may be configured to process the first downconverted signals during the first time period by downconverting the first downconverted signals using a first IF mixer frequency to generate the first and second DC carriers at DC. The IF mixer stage may be configured to process the second downconverted signals during the second time period by downconverting the second downconverted signals using a second intermediate frequency (IF) mixer frequency to generate the second DC carrier at DC corresponding to die second RF carrier, and processing the second downconverted signals without IF mixing to generate the first DC carrier at DC corresponding to the first RF carrier. For example, the first RF mixer frequency may be equal to an average of the first and second RF carrier frequencies, the second RF mixer frequency may be equal to the first RF carrier frequency of the first RF carrier, the first IF mixer frequency may be equal to half of a difference between the first and second RF carrier frequencies of the first and second RF carriers, and the second IF mixer frequency may be equal to a difference between the first and second RF carrier frequencies of the first and second RF carriers. As used herein, the term average may refer to a midpoint between the first and second RF carrier frequencies such that the first RF mixer frequency is equidistant from the first and second RF carrier frequencies. Accordingly, each of the first RI carrier frequency, the second RF carrier frequency, and the first RF mixer frequency (equal to the average of the first and second RF carrier frequencies) may remain fixed (or unchanged) over the first time period.

The RF mixer stage may be further configured to downconvert the first and second RF carriers using a third. RF mixer frequency during a third time period to generate third downconverted signals. Moreover, the IF mixer stage may be further configured to process the third downconverted signals during the third time period to provide the first and second DC carriers corresponding to the first and second RF carriers.

The IF mixer stage may be configured to process the first downconverted signals during the first time period by downconverting the first downconverted signals through an IF mixer stage using a first intermediate frequency (IF) mixer frequency to generate the first and second DC carriers at DC. Tire IF mixer stage may be configured, to process the second, downconverted signals during the second time period by downconverting the second downconverted signals through the IF mixer stage using a second, intermediate frequency (IF) mixer frequency to generate the second DC carrier at DC corresponding to the second RF carrier, and processing the second downconverted signals without IF mixing to generate the first DC carrier at DC corresponding to the first RF carrier. The IF mixer stage may be configured to process the third downconverted signals during the third time period by downconverting the third downconverted signals through the IF mixer stage using a third intermediate frequency (IF) mixer frequency to generate the first DC carrier at DC corresponding tire first RF carrier, and processing the third downconverted signals without IF mixing to generate the second DC carrier at DC corresponding to the second RF carrier.

For example, the first RF mixer frequency may be equal to an average of the first and second RF carrier frequencies of the first and second RF carriers, tire second RF mixer frequency may be equal to the first RF carrier frequency of the first RF carrier, and the third RF mixer frequency may be equal to the second RF carrier frequency of the second RF carrier. The first IF mixer frequency may be equal to half of a difference between the first and second RF carrier frequencies of tire first and second RF carriers, and the second and third IF mixer frequencies may be equal to differences between the first and second RF carrier frequencies of the first and second RF carriers.

In addition, an analog-to-digital converter may be coupled to the IF mixer stage with the analog-to-digital converter being configured to convert the first and second. DC carriers from analog signals to digital signals. A processor may be coupled, to the analog-to-digital converter with the processor being configured to process the digital signals to generate data streams corresponding to the first and second RF carriers. A user interface may be coupled to the processor with the user interface being configured to provide information responsive to the data streams.

The processor may be configured to estimate noise and/or interference, and the RF mixer stage may be configured to downconvert using the first RF mixer frequency during the first time period responsive to the processor estimating noise and/or interference for the first time period. The RF mixer stage may be configured to downconvert using the second RF mixer frequency during the second time period responsive to the processor estimating noise and/or interference for the second time period, different than the noise and/or interference for the first period. Accordingly, reception may be reconfigured responsive to changing noise and/or interference conditions.

More particularly, the processor may be configured to provide an estimate of noise and/or interference for the first time period. Responsive to the estimate of noise and/or interference for the first time period, the processor may be configured to calculate first performance metrics for downconverting and processing the first and second. RF carriers using the first and second RF mixer frequencies, and to select the first RF mixer frequency responsive to the first performance metrics. Similarly, the processor may be configured to provide an estimate of noise and/or interference for the second time period. Responsive to the estimate of noise and/or interference for the second time period, the processor may be configured to calculate second performance metrics for downconverting and processing the first and second RF carriers using the first and second RF mixer frequencies, and to select the second RF mixer frequency responsive to the second performance metrics.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings.

DETAILED DESCRIPTION

Figure 1:
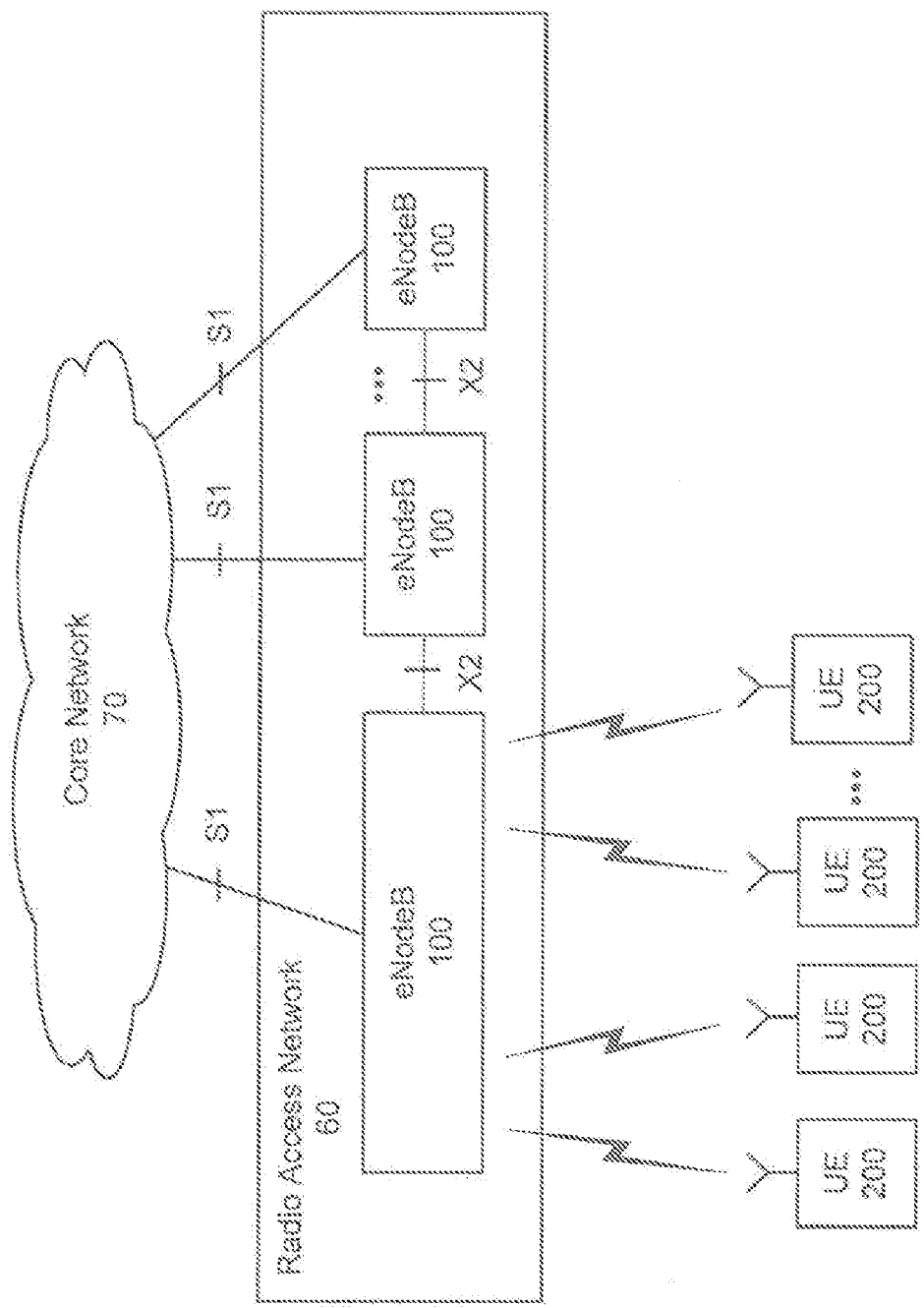
FIG. 1 is a block diagram of a communication system that is configured according to some embodiments.

The invention will now be described more fully hereinafter with reference to the accompanying drawings, in which examples of embodiments of the invention are shown. This invention may, however, be embodied in many different forms and should not be construed as limited to the embodiments set forth herein. It should also be noted that these embodiments are not mutually exclusive. Components from one embodiment may be tacitly assumed to be present/used in another embodiment.

For purposes of illustration and explanation only, these and other embodiments of the present invention are described herein in the context of operating in a RAN that communicates over radio communication channels with UEs. It will be understood, however, that the present invention is not limited to such embodiments and may be embodied generally in any type of communication network. As used herein, a UE can include any device that receives data from a communication network, and may include, but is not limited to, a mobile telephone ("cellular" telephone), laptop/portable computer, pocket computer, hand-held computer, and/or desktop computer.

In some embodiments of a RAN, several base stations can be connected (e.g., by landlines or radio channels) to a radio network controller (RNC). The radio network controller, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UTRAN, short for UMTS Terrestrial Radio Access Network, is a collective term for the Node B's and Radio Network Controllers which make up the UMTS radio access network. Thus, UTRAN is essentially a radio access network using wideband code division multiple access for UEs.

The Third Generation Partnership Project (3GPP) has undertaken to further evolve the UTRAN and GSM based radio access network technologies. In this regard, specifications for the Evolved Universal Terrestrial Radio Access Network (E-UTRAN) are ongoing within 3GPP. The Evolved Universal Terrestrial Radio Access Network (E-UTRAN) comprises the Long Term Evolution (LTE) and System Architecture Evolution (SAE).

Note that although terminology from 3GPP ($3^{rd}$ Generation Partnership Project) LTE (Long Term Evolution) is used in this disclosure to exemplify embodiments of the invention, this should not be seen as limiting the scope of the invention to only these systems. Other wireless systems, including WCDMA (Wideband Code Division Multiple Access), WiMax (Worldwide Interoperability for Microwave Access), UMB (Ultra Mobile Broadband) and GSM (Global System for Mobile Communications), may also benefit from exploiting embodiments of the present invention disclosed herein.

Also note that terminology such as eNodeB (Evolved Node B) and UE (User Equipment) should be considering non-limiting and does not imply a certain hierarchical relation between the two. In general an "eNodeB" and a "UE" may be considered as examples of respective different communications devices that communicate with each other over a wireless radio channel. While embodiments discussed herein may focus on wireless transmissions in a downlink from an eNodeB to a UE, embodiments of the invention may also be applied, for example, in the uplink.

FIG. 1 is a block diagram of a communication system that is configured to operate according to some embodiments of the present invention. An example Radio Access Network (RAN) 60 is shown that may be a Long Term Evolution (LTE) RAN. The LTE RAN is a variant of a 3GFP RAN where radio base stations (e.g., eNodeBs) 100 are connected directly to one or more core networks 70 rather than to radio network controller (RNC) nodes. In LTE, the functions of a radio network controller (RNC) node are performed by the radio base stations 100. The radio base stations 100 communicate with user equipment nodes (UEs) 200 that are within their respective communication service cells. The radio base stations 100 can communicate with one another through an X2 interface and with the core network(s) 70 through S1 interfaces, as is well known to one who is skilled in the art.

Figure 2:
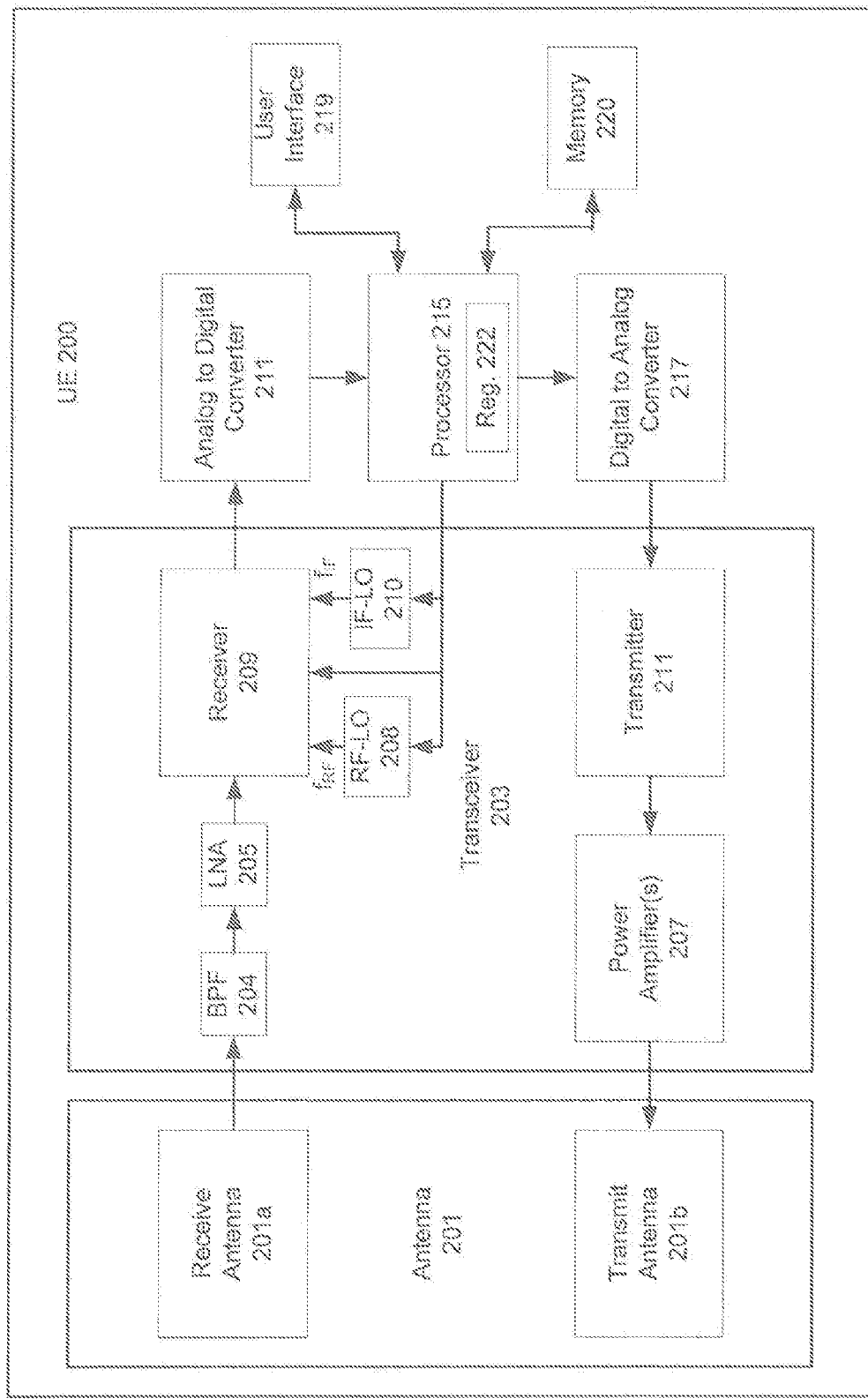
FIG. 2 is a block diagram of a UE according to some embodiments.

FIG. 2 is a block diagram of a LIE 200 of FIG. 1 according to some embodiments of the present invention. As shown, UE 200 may include antenna 201, transceiver 203, analog-to-digital converter (ADC) 211, processor 215 (including register 222), digital-to-analog converter (DAC) 217, user interface 219, and memory 220. While antenna 201 is shown with separate receive and transmit antenna(s) 201a and 201b, antenna 201 may include one antenna used for both transmission and reception, one antenna array including elements used for both transmission and reception, and/or separate antennas/arrays for transmission and reception. For example, one antenna may be coupled to receiver and transmitter chains through a switch and/or duplexer.

Transceiver 203 may include band pass filter (BPF) 204, low noise amplifier 205, radio frequency (RF) local oscillator (RF-LO) 208, receiver 209, and intermediate frequency local oscillator (IF-LO) 210 of a reception chain used for reception. Transceiver 203 may also include power amplifier(s) 207 and transmitter 211 of a transmission chain used for transmission. UE 200 may thus transmit and receive communications through radio access network 60 to provide voice and/or data communications.

While functional elements of FIG. 2 are shown separately in respective blocks for purposes of illustration, functionalities may be combined differently, orders of functionalities may be arranged differently, additional functionalities may be added, and/or illustrated, functionalities may be omitted according to other embodiments of the present invention. As discussed above, antenna 201 may, for example, include only a single antenna used for both transmission and reception. In addition or in an alternative, BPF 204 and/or LNA 205 may be included as elements of antenna (201) and/or receiver (209); RF-LO 208 and/or IF-LO 210 may be included as elements of receiver 209; and/or power amplifier 207 may be included as an element of transmitter 211 and/or antenna 201.

As discussed in greater detail below, UE 200 may be configured to simultaneously receive multiple radio frequency (RF) carriers (e.g., RF component carriers) over respective different RF carrier frequencies. Moreover, receiver 209 may include a radio frequency (RE) mixing stage coupled with an intermediate frequency (IF) mixing stage that is adaptable to different interference conditions. Accordingly, processor 215 may adapt the IF mixing stage (provided in receiver 209 as discussed below), the RF mixer frequency $f_{RF}$ (provided by RF-LO 208), and the IF mixer frequency $f_{IF}$ (provided by IF-LO 210) according to changing interference conditions to improve overall reception.

Figure 3:
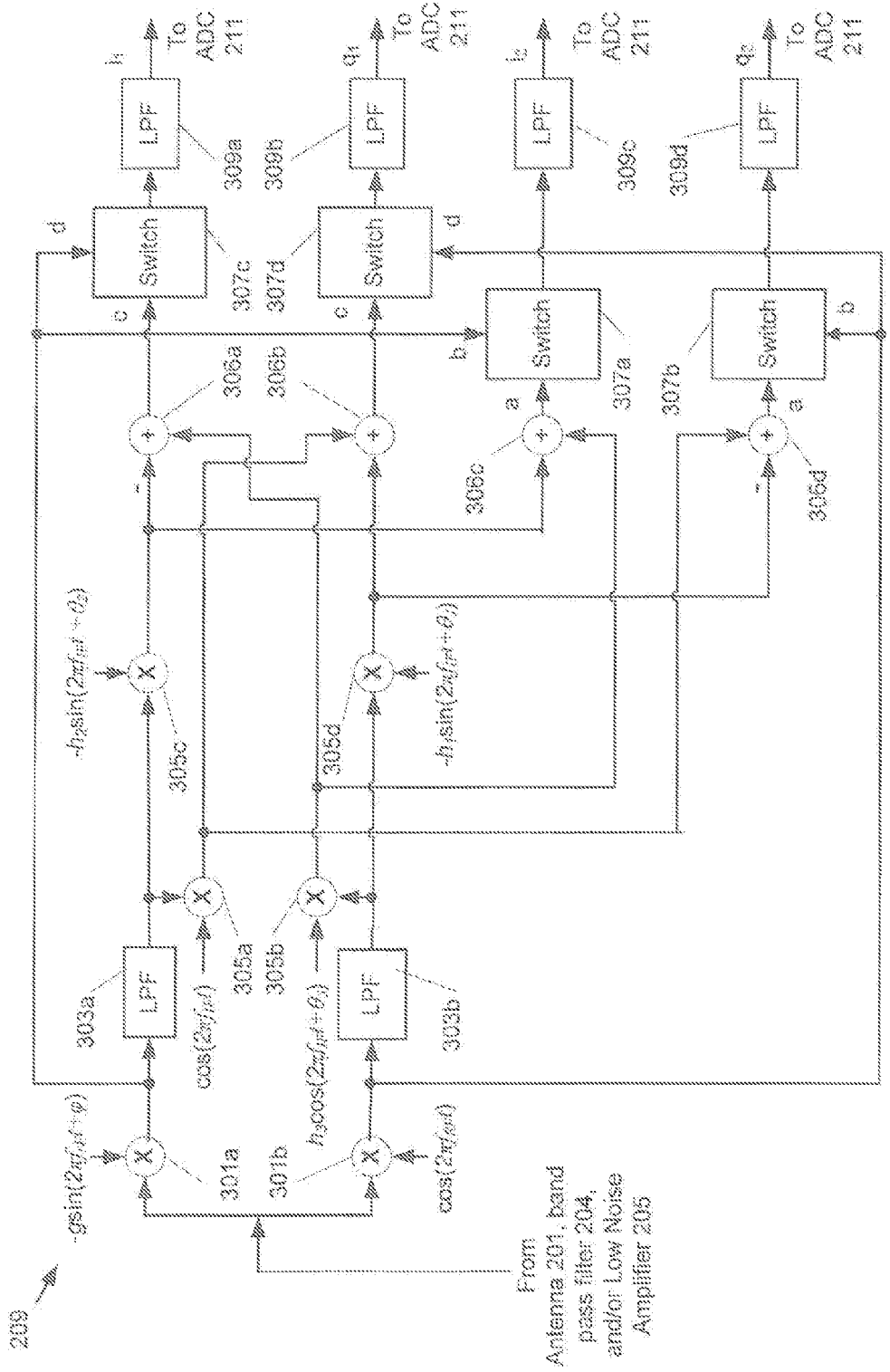
FIG. 3 is an a schematic diagram of a UE receiver of FIG. 2 according to some embodiments.

FIG. 3 is a schematic diagram illustrating elements of receiver 209 according to some embodiments of the present invention. As shown, an RF mixing stage may include RF mixers 301a and 301b that receive multiple RF carriers provided by antenna 201, BPF 204, and/or LNA 205. By providing BPF 204, a bandwidth of RF signals received at the RF mixing stage may be reduced thereby reducing sources of interference. An IF mixing stage may include filters 303a-b (such as low pass filters), mixers 305a-d, adders 306a-d, switches 307a-d, and filters 309a-d (such as low pass filters). Accordingly, RF mixer frequency $f_{RF}$ may be provided by RF-LO 208 as an input for mixers 301a-b of the RF mixing stage, and IF mixer frequency $f_{IF}$ may be provided by IF-LO 210 as an input for mixers 305a-d of the IF mixing stage as shown in FIGS. 2 and 3. According to some embodiments, filters 303a-d and 309a-d may be low pass filters, but each of filters 303a-d and 309a-d may be any type of filter (e.g., band-pass filter) that attenuates undesired signal energy.

Switches 307a-b may thus be configured to accept a inputs or b inputs responsive to processor 215, and switches 307c-d may be configured to accept c inputs or d inputs responsive to processor 215, to provide different IF mixing stage configurations with a same RF mixing stage. Accordingly, receiver 209 may provide multiple receiver configurations for different interference conditions without requiring addition of significant additional elements.

As discussed in greater detail below, when receiving first and second RF carriers CC1 and CC2 (also referred to as RF component carriers) at respective first and second RF carrier frequencies $ccf_{RF1}$ and $ccf_{RF2}$, processor 215 may configure receiver 209 in three different configurations by changing: RF mixer frequency $f_{RF}$ generated by RF-LO 208; IF mixer frequency $f_{IF}$ generated by IF-LO 210; settings of switches 307a-b; and settings of switches 307c-d. In the following specification, three configurations of receiver 209 of FIG. 3 will be referred to as Case A, Case B, and Case C as set forth in the table below:

|  | Case A | Case B | Case C |
| --- | --- | --- | --- |
| $f_{RF}$ (RF mixer freq.) | $ccf_{RF1}$ | $(ccf_{RF2} + ccf_{RF1})/2$ | $ccf_{RF2}$ |
| $f_{IF}$ (IF mixer freq.) | $ccf_{RF2} - ccf_{RF1}$ | $(ccf_{RF2} - ccf_{RF1})/2$ | $ccf_{RF1} - ccf_{RF2}$ |
| Switches 307a-b | input-b | input-a | input-a |
| Switches 307c-d | input-c | input-c | input-d |
| DC Output for CC1 | $i_2, q_2$ | $i_2, q_2$ | $i_2, q_2$ |
| DC Output for CC2 | $i_1, q_1$ | $i_1, q_1$ | $i_1, q_1$ |

Accordingly, processor 215 may estimate noise/interference characteristics, and responsive to the estimation, processor 215 may select one of the above referenced receiver configurations to improve reception of the first and second RF carriers CC1 and CC2. Moreover, processor 215 may change the configuration of receiver 209 at different times/periods for reception of RF carriers CC1 and CC2 even though the respective RF carrier frequencies $ccf_{RF1}$ and $ccf_{RF2}$ remain unchanged.

More particularly, processor 215 may provide an estimate of noise and/or interference, and calculate performance metrics for downconverting each of the RF carriers CC1 and CC2 from RF to DC using each receiver configuration (e.g., Case A, Case B, and Case C) responsive to the estimate of noise and/or interference. Processor 215 may then use the calculated performance metrics to select a receiver configuration (e.g. Case A, Case B, or Case C) that provides a best aggregate performance for receiving RF carriers CC1 and CC2 in accordance with the estimate of noise and/or interference. Moreover, processor 215 may repeatedly/periodically provide new estimates of noise and/or interference, and each new estimate of noise and/or interference may be used to calculate new performance metrics for downconverting each of the RF carriers from RF to DC. Each calculation of new performance metrics may be used as a basis for a new selection of a receiver configuration that provides a best aggregate performance in accordance with each new estimate of noise and/or interference. Accordingly, receiver 209 may be repeatedly reconfigured between Cases A, B, and C while receiving RF carriers CC1 and CC2 on unchanging RF carrier frequencies $ccf_{RF1}$ and $ccf_{RF2}$ to match configurations of receiver 209 with changing noise and/or interference conditions.

Figure 4:
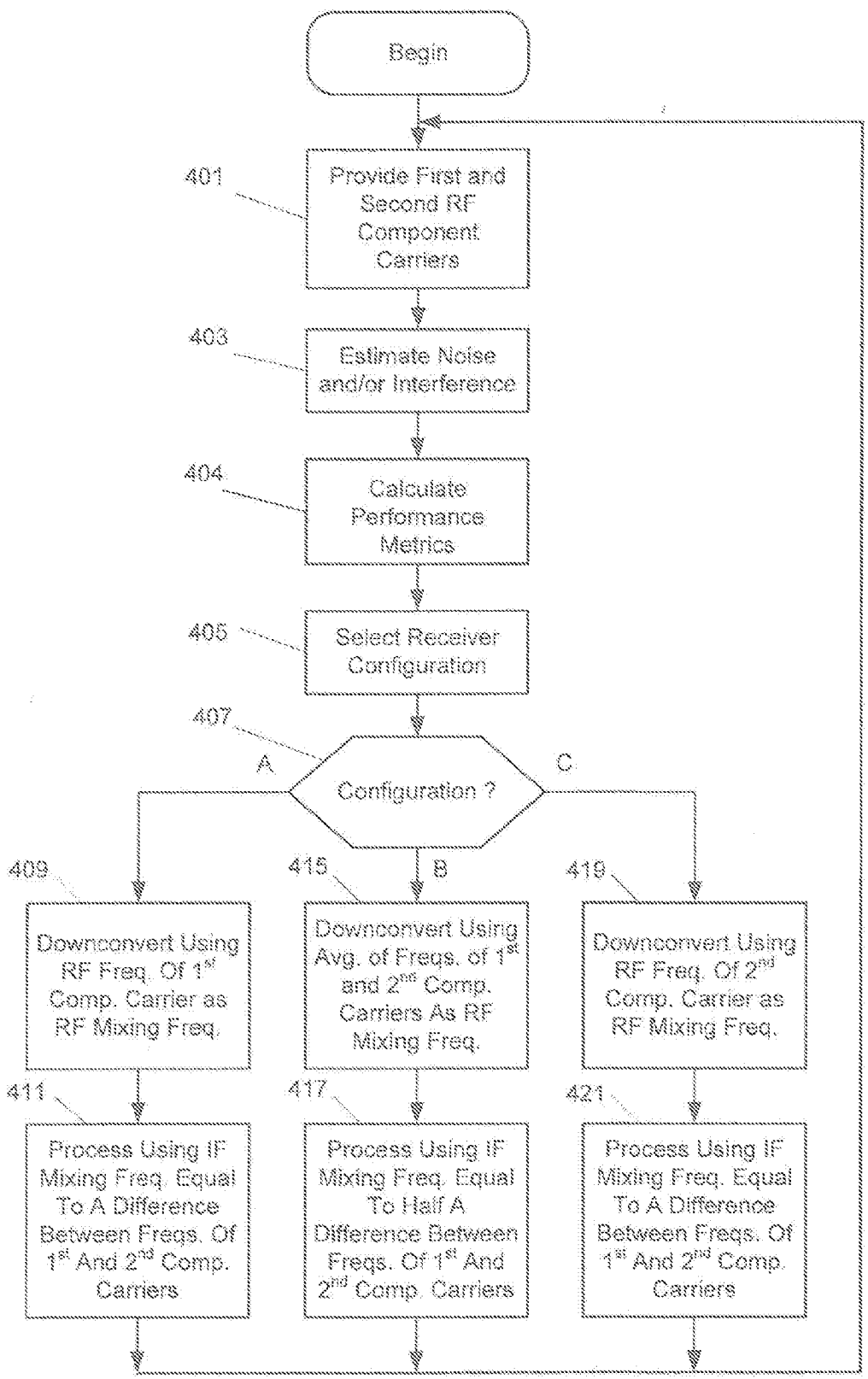
FIG. 4 is a flow chart illustrating operations of a UE receiver of FIG. 3 according to some embodiments.

Operations of LTE 200 will now be discussed with reference to the flow chart of FIG. 4. At block 401, HE 200 may receive RF carriers CC1 and CC2 over respective RF carrier frequencies $ccf_{RF1}$ and $ccf_{RF2}$ that may remain unchanged throughout operations of FIG. 4. At block 403, processor 215 may estimate noise and/or interference conditions for reception of RF carriers CC1 and CC2, for example, considering strengths of potentially interfering signals, receiver parameters related to IQ imbalance harmonic rejection, SINR, throughput, etc., and at block 404, processor 215 may calculate performance metrics for downconverting each of the RF carriers CC1 and CC2 from RF to DC using each receiver configuration (e.g. Case A, Case B, and Case C) responsive to the estimate of noise and/or interference. When estimating noise and/or interference conditions at block 403, processor 215 may consider power levels of desired, signals and noise and/or interference of all relevant carriers.

At blocks 405 and 407, the performance medics (calculated at block 404 based, on the estimate of noise and/or interference conditions) may be used to select one of the receiver configurations discussed above. Moreover, processor 215 may repeatedly (e.g., periodically) estimate interference conditions and calculate performance metrics, and based on changing interference conditions and resulting different calculations of performance metrics, processor 215 may change the receiver configuration even though the RF carriers CC1 and CC2 and respective RF carrier frequencies $ccf_{RF1}$ and $ccf_{RF2}$ remain unchanged. Processor 215, for example, may changes configurations of receiver 209 between Cases A, B, and C during continuous reception of RF carriers CC1 and CC2 at respective unchanged RF carrier frequencies $ccf_{RF1}$ and $ccf_{RF2}$ to adapt to changing noise and/or interference conditions.

Responsive to a first estimation of noise and/or interference conditions for a first time period at block 403 and calculation of performance metrics at block 404, for example, processor 215 may select the receiver configuration of Case A at blocks 405 and 407 to receive RF carriers CC1 and CC2 at respective RF carrier frequencies $ccf_{RF1}$ and $ccf_{RF2}$ during the first time period. Accordingly, processor 215 may: instruct RF-LO 208 to generate RF mixer frequency $(f_{RF})$ equal to the RF carrier frequency $ccf_{RF1}$ of RF carrier CC1; instruct IF-LO 210 to generate IF mixer frequency $f_{IF}$ equal to a difference between RF carrier frequencies $ccf_{RF1}$ and $ccf_{RF2}$ instruct switches 307a and 307b to select the b inputs; and instruct switches 307c and 307d to select c inputs. Accordingly, DC outputs for RF carrier CC1 may be provided as $i_2$ and $q_2$ at outputs of switches 307a-b (and filters 309c-d), and DC outputs for RF carrier CC2 may be provided as $i_1$ and $q_1$ at outputs of switches 307c-d (and filters 309a-b).

According to the receiver configuration of Case A, the RF mixer stage (including mixers 301a and 301b) of receiver 209 is configured to downconvert RF carriers CC1 and CC2 using an RF mixer frequency $f_{RF}$ that is equal to the RF carrier frequency $ccf_{RF1}$ of RF carrier CC1 at block 409. At block 411, the IF mixer stage (including filters 303a-b, mixers 305a-d, adders 306a-d, and switches 307a-d) is configured to process the downconverted signals from the outputs of mixers 301a-b using an IF mixer frequency equal to a difference between the RF carrier frequencies $ccf_{RF1}$ and $ccf_{RF2}$ of RF carriers CC1 and CC2.

More particularly, the IF mixer stage (including filters 303a-b, mixers 305a-d, adders 306a-d, switches 307a-d, and filters 309a-d) may process outputs of mixers 301a-b by downconverting outputs of mixers 301a-b using the IF mixer frequency $f_{IF}$ equal to the difference between the RF carrier frequencies $ccf_{RF1}$ and $ccf_{RF2}$ to generate RF carrier CC2 at DC as $i_1, q_1$ corresponding to RF carrier CC2. At the same time, the IF mixer stage (including filters 303a-b, mixers 305a-d, adders 306a-d, switches 307a-d, and filters 309a-d) may process outputs of mixers 301a-b without IF mixing to generate RF carrier CC1 at DC as $i_2, q_2$ corresponding to RF carrier CC1. In the configuration of Case A, outputs of mixers 301a-b may thus be subjected to IF downconversion through filters 303a-b, mixers 305a-d, adders 306a-b, c inputs of switches 307c-d, and filters 309a-b to provide RF carrier CC2 at DC as $i_1$, $q_1$, while outputs of mixers 301a-b are processed through b inputs of switches 307a-b and filters 309c-d to provide RF carrier CC1 at DC as $i_2$, $q_2$ without IF mixing. By selecting RF mixer frequency $f_{RF}$ equal to RF carrier frequency $ccf_{RF1}$, RF carrier CC1 may thus be provided at DC without IF mixing in Case A.

Responsive to a second estimation of noise and/or interference characteristics for a second time period at block 403, processor 215 may select the receiver configuration of Case B at blocks 405 and 407 to receive RF carriers CC1 and CC2 at respective RF carrier frequencies $ccf_{RF1}$ and $ccf_{RF2}$ during the second time period (where RF carrier frequencies $ccf_{RF1}$ and $ccf_{RF2}$ are unchanged from the first time period). Accordingly, processor 215 may: instruct RF-LO 208 to generate RF mixer frequency $f_{RF}$ equal to the average of RF carrier frequencies $ccf_{RF1}$ and $ccf_{RF2}$ (i.e., $f_{RF}=(ccf_{RF1}+ccf_{RF2})/2$) of RF carriers CC1 and CC2; instruct IF-LO 210 to generate IF mixer frequency $f_{IF}$ equal to half of a difference between RF carrier frequencies $ccf_{RF1}$ and $ccf_{RF2}$ (i.e., $(ccf_{RF1}-ccf_{RF2})/2$); instruct switches 307a and 307b to select the a inputs; and instruct switches 307c and 307d to select c inputs. Accordingly, DC outputs for RF carrier CC1 may be provided as $i_2$ and $q_2$ at outputs of switches 307c-d (and filters 309a-b), and DC outputs for RF carrier CC2 may be provided as $i_1$ and $q_1$ at outputs of switches 307a-b (and filters 309c-d). As used herein, the term average may refer to a midpoint between RF carrier frequencies $ccf_{RF1}$ and $ccf_{RF2}$ such that RF mixer frequency $f_{RF}$ is equidistant from RF carrier frequencies $ccf_{RF1}$ and $ccf_{RF2}$. Accordingly, each of RF carrier frequencies $ccf_{RF1}$ and $ccf_{RF2}$ and RF mixer frequency $f_{RF}$ (equal to the average of RF carrier frequencies $ccf_{RF1}$ and $ccf_{RF2}$ may remain fixed (or unchanged) over any time period for which receiver 209 is configured according to Case B.

According to the receiver configuration of Case B, the RF mixer stage (including mixers 301a and 301b) of receiver 209 is configured to downconvert RF carriers CC1 and CC2 using an RF mixer frequency $f_{RF}$ that is equal to an average of the RF carrier frequencies $ccf_{RF1}$ and $ccf_{RF2}$ of RF carriers CC1 and CC2 at block 415. At block 417, the IF mixer stage (including filters 303a-b, mixers 305a-d, adders 306a-d, and switches 307a-d) is configured to process the downconverted signals from the outputs of mixers 301a-b using an IF mixer frequency equal to half of a difference between the RF carrier frequencies $ccf_{RF1}$ and $ccf_{RF2}$ of RF carriers CC1 and CC2.

More particularly, the IF mixer stage (including filters 303a-b, mixers 305a-d, adders 306a-b, switches 307c-d, and filters 309a-b) may process outputs of mixers 301a-b by downconverting outputs of mixers 301a-b using the IF mixer frequency $f_{IF}$ equal to half fire difference between the RF carrier frequencies $ccf_{RF1}$ and $ccf_{RF2}$ to generate RF carrier CC1 at DC as $i_2$, $q_2$ corresponding to RF carrier CC1. At the same time, the IF mixer stage (including filters 303a-b, mixers 305a-d, adders 306c-d, switches 307a-b, and filters 309c-d) may process outputs of mixers 301a-b by downconverting outputs of mixers 301a-b using the IF mixer frequency $f_{IF}$ equal to half the difference between the RF carrier frequencies $ccf_{RF1}$ and $ccf_{RF2}$ to generate RF carrier CC2 at DC as $i_1$, $q_1$ corresponding to RF carrier CC2. In the configuration of Case B, outputs of mixers 301a-b are subjected to IF mixing to generate both of RF earners CC1 and CC2 at DC in Case B.

Responsive to a third estimation of noise and/or interference characteristics for a third time period at block 403, processor 215 may select the receiver configuration of Case C at blocks 405 and 407 to receive RF carriers CC1 and CC2 at respective RF carrier frequencies $ccf_{RF1}$ and $ccf_{RF2}$ during the third time period (where RF carrier frequencies $ccf_{RF1}$ and $ccf_{RF2}$ are unchanged from the first and second time periods).

Accordingly, processor 215 may: instruct RF-LO 208 to generate RF mixer frequency ($f_{RF}$) equal to the RF carrier frequency $ccf_{RF2}$ of RF carrier CC2; instruct IF-LO 210 to generate IF mixer frequency $f_{IF}$ equal to a difference between RF carrier frequencies $ccf_{RF1}$ and $ccf_{RF2}$ instruct switches 307a and 307b to select the a inputs; and instruct switches 307c and 307d to select d inputs. Accordingly, DC outputs for RF carrier CC1 may be provided as $i_2$ and $q_2$ at outputs of switches 307a-b (and filters 309c-d), and DC outputs for RF carrier CC2 may be provided as $i_1$ and $q_1$ at outputs of switches 307c-d (and filters 309a-b).

According to the receiver configuration of Case C, the RF mixer stage (including mixers 301a and 301b) of receiver 209 is configured to downconvert RF carriers CC1 and CC2 using an RF mixer frequency $f_{RF}$ that is equal to the RF carrier frequency $ccf_{RF2}$ of RF carrier CC2 at block 419. At block 421, the IF mixer stage (including filters 303a-b, mixers 305a-d, adders 306a-d, and switches 307a-d) is configured to process the downconverted signals from the outputs of mixers 301a-b using an IF mixer frequency equal to a difference between the RF carrier frequencies $ccf_{RF1}$ and $ccf_{RF2}$ of RF carriers CC1 and CC2.

More particularly, the IF mixer stage (including filters 303a-b, mixers 305a-d, adders 306a-d, switches 307a-d, and filters 309a-d) may process outputs of mixers 301a-b by downconverting outputs of mixers 301a-b using the IF mixer frequency $f_{IF}$ equal to the difference between the RF carrier frequencies $ccf_{RF1}$ and $ccf_{RF2}$ to generate RF carrier CC1 at DC as $i_2$, $q_2$ corresponding to RF carrier CC1. At the same time, the IF mixer stage (including filters 303a-b, mixers 305a-d, adders 306a-d, switches 307a-d, and filters 309a-d) may process outputs of mixers 301a-b without IF mixing to generate RF carrier CC2 at DC as $i_1$, $q_1$ corresponding to RF carrier CC2. In the configuration of Case C, outputs of mixers 301a-b may thus be subjected to IF downconversion through filters 303a-b, mixers 305a-d, adders 306c-d, a inputs of switches 307a-b, and filters 309c-d to provide RF carrier CC1 at DC as $i_2$, $q_2$, while outputs of mixers 301a-b are processed through d inputs of switches 307c-d and filters 309a-b to provide RF carrier CC2 at DC as $i_1$, $q_1$ without IF mixing. By selecting RF mixer frequency $f_{RF}$ equal to RF carrier frequency $ccf_{RF2}$, RF carrier CC2 may thus be provided at DC without IF mixing in Case C.

As discussed above, RF carriers CC1 and CC2 may be provided at DC as I and Q outputs $i_1$, $q_1$, $i_2$, and $q_2$. These DC outputs may be converted from analog to digital at analog-to-digital converter 211, and processor 215 may process these digital signals to generate data streams corresponding to the first and second RF carriers. Accordingly, user interface 219 may be configured to provide information responsive to these data streams. The data streams, for example, may be used: to generate speech at a speaker of user interface 219 for a radiotelephone conversation; to provide media content (e.g., audio and/or video) at a speaker and/or display of user interface 219 from a remote streaming server; to provide web information (e.g., a web page) at a display of user interface 219 from a remote server; etc.

As discussed above, receiver configurations, and in particular, RF and IF local oscillator (LO) frequencies of receiver 209 may be determined by interference conditions/characteristics to improve receiver performance. While embodiments of the present invention may be generally applicable to any multi-carrier wireless system operating in an environment where interference exists, intra-band non-contiguous carrier aggregation (CA) and dual-carrier reception for LTE DL are discussed in greater detail herein.

According to embodiments of the present invention, frequencies of RF and IF local oscillators 208 and 210 may be adapted based on interference conditions even though RF carrier frequencies remain unchanged. Given each hypothesis (e.g., Case A, Case B, and Case C) of receiver configuration, interference levels may be calculated using receiver parameters related to IQ imbalance harmonic rejection as well as interference conditions, interference conditions may be updated regularly or irregularly, and, depending on how often interference conditions are updated, receiver 209 can mitigate the interference instantaneously or over a long-term by choosing a receiver configuration to optimize/improve a given performance quantity, e.g. SINR, minimum SINR, total throughput, etc.

Figure 5A:
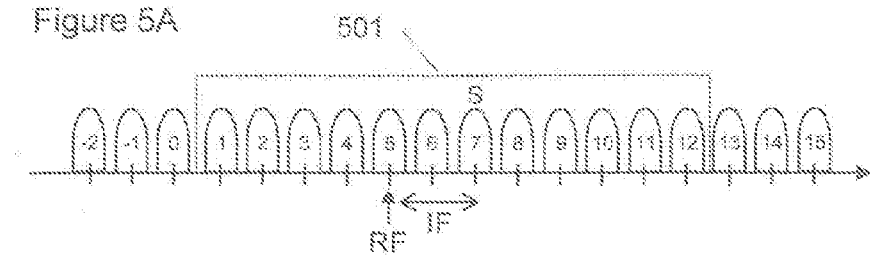
FIGS. 5A to 5C, 6A to 6C, and 7A to 7C are diagrams illustrating interfering signals according to some embodiments.
Figure 5B:
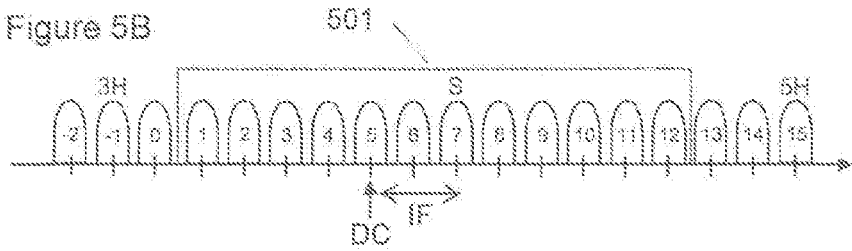
Figure 5C:
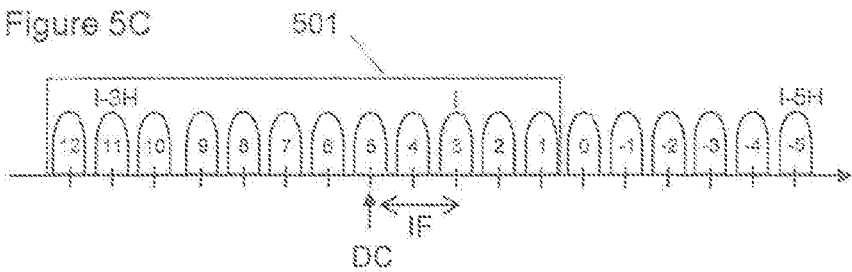

By way of example, twelve uniformly distributed RF carriers having identical bandwidths (numbered 1 through 12) may be allowed through band pass filter 204, as shown in FIGS. 5A to 5C. As illustrated by bracket 501, other RF carriers frequencies (e.g., RF carrier frequencies numbered −2 to 0 and 13-15) may be suppressed by BPF 204.

In the example of FIGS. 5A to 5C, a RF carrier at RF carrier frequency 7 is to be received (i.e., RF carrier frequency 7 is the desired signal), and RF mixer frequency $f_{RF}$ is set equal to the frequency of RF earner frequency 5 (i.e., $f_{RF}=ccf_{RF1}$), as illustrated in FIG. 5A. Accordingly, the IF mixer frequency $f_{IF}$ is set equal to the spacing of two carriers (i.e., $f_{IF}$ is a difference between RF carrier frequency 7 and RF carrier frequency 5), and thus receiver 209 is configured as discussed above with respect to Case A and FIGS. 2 and 3 with first RF carrier frequency $ccf_{RF1}$ (of RF carrier CC2) equal to RF carrier frequency 5 and with carrier frequency $ccf_{RF2}$ (of RF carrier CC2) equal to RF carrier frequency 7.

In the example of FIGS. 5A to 5C, it is assumed that RF mixing (i.e., at RF mixer stage including mixers 301a and 301b) is imbalanced, while the IF mixing stage is completely balanced, i.e., such that:

$$h_1=h_2=h_3=1$$

$$\theta_1=\theta_2=\theta_3=0 \quad (1)$$

After RF mixing through mixers 301a and 301b, the received signal at RF carrier frequency 7 C7 (i.e., also referred to as CC2 received over carrier frequency $ccf_{RF2}$) is reduced or downconverted toward DC using the RF mixer frequency (i.e., $f_{RF}=ccf_{RF1}$) as shown in FIG. 5B, and the image is increased or upconverted toward DC (i.e., in the opposite direction) using the RF mixer frequency (i.e., $f_{RF}=ccf_{RF1}$) as shown in FIG. 5C. Note that the image may interfere with the desired signal (e.g., RF carrier 3 may interfere with RF carrier 7 and vice versa). Although RF mixing (using mixers 301a and 301b) may cause harmonic mixing, the harmonics of the RF carrier frequency (i.e., $ccf_{RF2}$ which is the RF carrier frequency of C7, also referred to as CC2) are located out of band and may already be suppressed by band pass filter 204 so that RF harmonic mixing may be ignored.

Since RF mixing (using mixers 301a-b) is followed by IF mixing (using mixers 305a-d, and adders 306a-d), the downconverted signal is again downconverted toward DC using the IF mixer frequency $f_{IF}$ and thus carrier 7 C7 (also referred to as CC2) is downconverted to DC. Here, local oscillators RF-LO 208 and IF-LO 210 are assumed to be implemented using imperfect harmonic rejection mixing (but perfect IQ imbalance). Therefore, some harmonics may move to DC and interfere with carrier 7 C7 (also referred to as CC2) because of harmonic mixing. For example, carrier 1 and carrier 15 may move to DC because of $3^{rd}$ and $5^{th}$ harmonic mixing, respectively, as shown in FIG. 5B, but the interference may be negligible due to band pass filter 204. Note that the image of carrier 7 C7 (carrier 3) may move to DC because of IQ imbalance. Also note that carrier 11 may move to DC because of composition of IQ imbalance and $3^{rd}$ harmonic mixing.

Figure 6A:
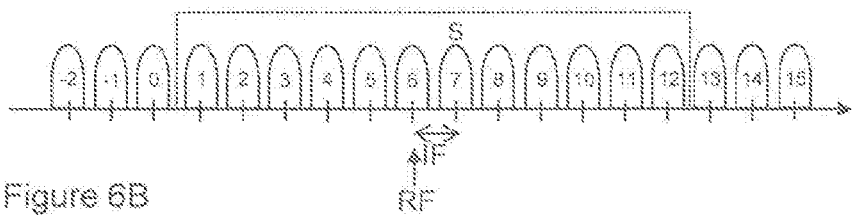
Figure 6B:
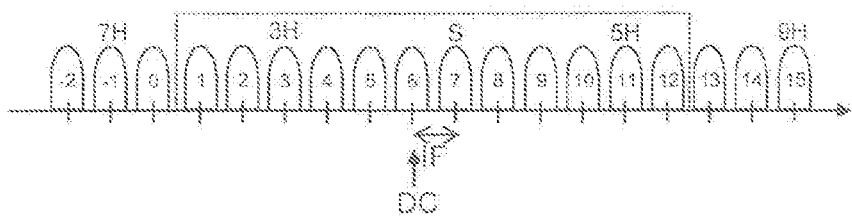
Figure 6C:
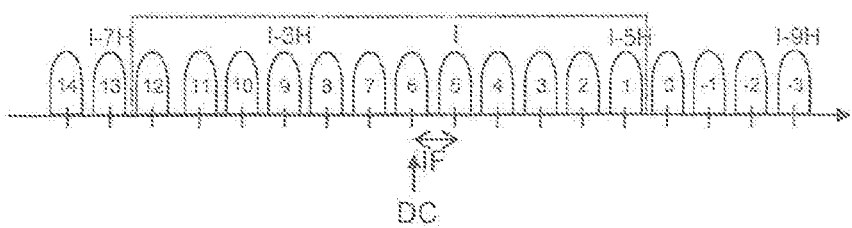

Referring now to FIGS. 6A to 6C, RF mixer frequency $f_{RF}$ may be set equal to the frequency of RF carrier frequency 6, as illustrated in FIG. 6A. Accordingly, the IF mixer frequency $f_{IF}$ is set equal to the spacing of one carrier (i.e., $f_{IF}$ is a difference between RF carrier frequency 7 to be received and frequency 6), and thus receiver 209 is configured as discussed above with respect to Case B and FIGS. 2 and 3 with first RF carrier frequency $ccf_{RF1}$ (of RF carrier CC1) equal to RF carrier frequency 5, with carrier frequency $ccf_{RF2}$ (of RF carrier CC2) equal to RF carrier frequency 7, and with RF mixer frequency $f_{RF}$ equal to an average of the carrier frequencies $ccf_{RF1}$ and $ccf_{RF2}$.

As discussed above, IQ imbalance may move the image to DC and may cause interference, as shown in FIG. 6C. Then, harmonic mixing may move many harmonics to DC as well. For example, carrier 3 and carrier 11 may move down to DC because of $3^{rd}$ and $5^{th}$ harmonic mixing, as shown in FIG. 6B. Also, the image of carrier 7 (i.e., carrier 5) goes down to DC because of IQ imbalance. Additionally, carrier 9 and carrier 1 go down to DC because of composition of IQ imbalance and $3^{rd}$ and $5^{th}$ harmonic mixing.

Figure 7A:
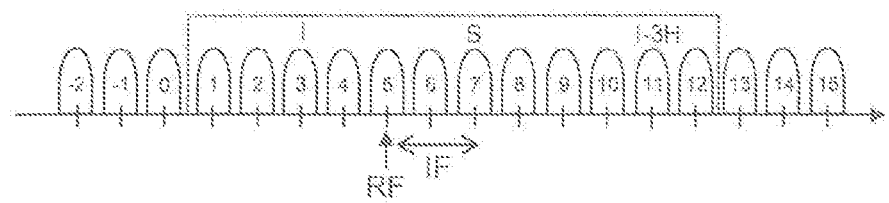
Figure 7B:
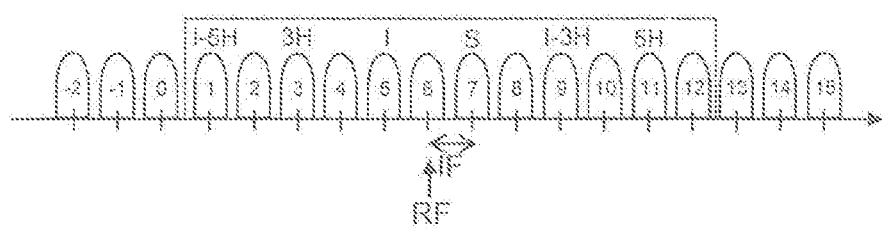
Figure 7C:
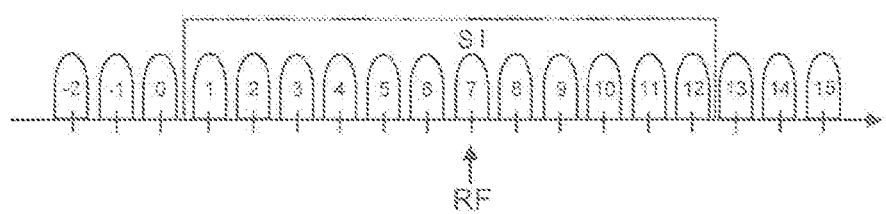

Interference signals of these two cases are summarized in FIG. 7A (Case A) and FIG. 7B (Case B). When the RF mixer frequency is set to the RF carrier frequency of carrier 5, carrier 3 may interfere with carrier 7 (due to IQ imbalance) and carrier 11 (due to IQ imbalance and the $3^{rd}$ harmonic). When the RF mixer frequency is set to the RF carrier frequency of carrier 6, carrier 7 may interfere with carrier 1 (due to IQ imbalance and the $5^{th}$ harmonic), carrier 3 (due to the $3^{rd}$ harmonic), carrier 5 (due to IQ imbalance), carrier 9 (due to IQ imbalance and the $3^{rd}$ harmonic) and carrier 11 (due to the $5^{th}$ harmonic). FIG. 7C (Case C) shows the case where the RF mixer frequency is set to the RF: carrier frequency of carrier 7. In this case, the RF mixer frequency is the same as the carrier frequency of carrier 7 (also referred to as CC2), and therefore, receiver 209 may be configured as a direct conversion receiver with switches 307a-b accepting a inputs and with switches 307c-d accepting d inputs, as discussed above with respect to FIG. 3 so that carrier 7 may be converted to DC at $i_1$ and $q_1$, and carrier 5 may be converted to DC at $i_2$ and $q_2$. Stated in other words, carrier 7 may be directly down-converted to DC without going to IF. In this case, the self-image, i.e., the image from carrier 7, may be the only interference that goes down to DC because harmonics of the RF carrier frequency may already be suppressed by band pass filter 204.

All the carrier frequencies may not be considered as candidates for the RF mixer frequency. For example, if the RF mixer frequency is set to the RF carrier frequency of carrier 1, e.g., the corner frequency of the band allowed by band pass filter 204, a resulting interference level may be reduced because out-of-band carriers may be suppressed by the band pass filter 204. However, The IF may be as high as 4 carrier spacings for carrier 5 and as high as 6 carrier spacings for carrier 7, which may make implementation of the IF mixing stage more difficult.

By providing receiver 209 that is configurable to Cases A, B, and C, different configurations, different RF mixing frequencies, and/or different IF frequencies may be selected for different interference conditions. By way of example, receiver configurations can be adapted to avoid extremely-strong interference at either image frequency or at harmonic frequencies. It may not always be possible to avoid strong interference completely, however, and thus it may be desirable to carefully select the receiver configuration, e.g., based on a well-defined cost function. Stated in other words, it may be desirable to define a cost function that reflects the system target and that selects the receiver configuration based on the cost function.

A cost function may include a performance metric such as a minimum SINR and sum throughput, a hardware efficiency metric such as total power consumption, and/or a function of both performance and hardware metrics. In the following example, receiver 209 is configured so drat a minimum SINR is increased/maximized.

In the following discussion of some embodiments, a power of carrier i is denoted by $P_i$, and the image rejection ratio and the harmonic rejection ratio of the $k^{th}$ harmonic are denoted by K and $H_k$, respectively, in Case A, the SINR of carrier 7 may be expressed as:

$$SINR_A = \frac{P_7}{K^2 P_3 + (KH_3)^2 P_{11}}. \quad (2)$$

Here, carrier 11 is downconverted to DC and may thus interfere with carrier 7 because of both IQ imbalance and harmonic mixing so that the interference level is given by KH_3. Likewise, in Case B, the SINR of carrier 7 may be expressed as:

$$SINR_B = \frac{P_7}{(H_3^2 P_3 + H_5^2 P_{11}) + (K^2 P_5 + (KH_3)^2 P_9 + (KH_5)^2 P_1)}. \quad (3)$$

In general, equations (2) and (3) may be re-written as:

$$SINR = \frac{P_{RF+IF}}{\sum_k H_{2k+1}^2 P_{RF+(-1)^k(2k+1)IF} + K^2 P_{RF-IF} + \sum_k (KH_{2k+1})^2 P_{RF-(-1)^k(2k+1)IF}} \quad (4)$$

Here, carrier (RF+IF) is the desired signal, carrier (RF-IF) is the image, carrier RF+$(-1)^k$(2 k+1)IF is the (2 k+1)$^{th}$ harmonic (odd harmonic) of received signal, and carrier RF+(− 1)$^k$(2 k+1)IF is the (2 k+1)$^{th}$ harmonic (odd harmonic) of image. As mentioned previously, the out-of-band signal is suppressed by the band selection filter so that it can be ignored in equation (4).

Figure 8A:
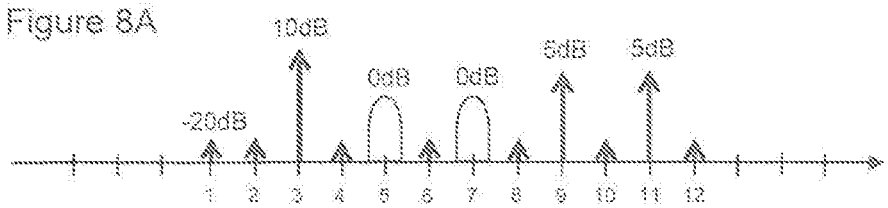
FIGS. 8A to 8B are examples of interference at carrier frequencies used as examples to select receiver configurations according to some embodiments.
Figure 8B:
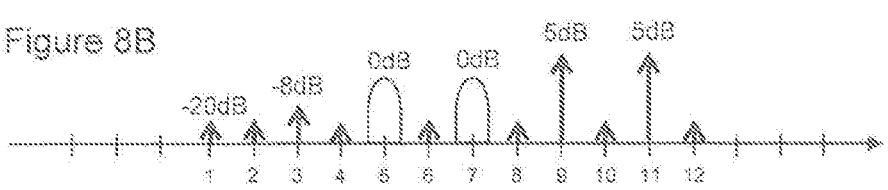

Accordingly, configurations of receiver 209 may be adapted based on different interference conditions. For purposes of illustration, an image rejection ratio of 31 dBc and a harmonic rejection ratio of 40 dBc may be assumed implying that IQ imbalance is assumed to be more dominant an impairment than harmonic mixing in this example. As shown in FIGS. 8A and 8B, carrier 5 (also referred to as CC1) and carrier 7 (also referred to as CC2) may be received simultaneously, and there are some dominant interferences on RF carriers 3, 9 and 11. A remainder of interference may be considered to be negligible (e.g., having an interference level less than −20 dBc).

Considering a first interference condition (Case I) illustrated in FIG. 8A using equation (4), SINRs of carrier 5 and carrier 7 may be given as follows.
Case A: 31.7 dB, 21.7 dB
Case B: 30.1 dB, 27.2 dB
Case C: 26.7 dB, 31.7 dB Note that these calculations give a same number of SINR values as there are carriers for each configuration. Stated in other words, a performance metric may be calculated for each RF carrier according to each receiver configuration based on estimated noise and/or interference, and the resulting performance metrics may be used to select a receiver configuration to be used. If interested in maximizing minimum SINR, Case B may be the preferred configuration of receiver 209 under this interference condition because Case A involves carrier 3 as the image (as shown in FIGS. 5A-C, 6A-C, and 7A-C) and the interference level may be significantly higher due to relatively high power (10 dB) and low image rejection ratio.

Considering a second interference condition (Case II) illustrated in FIG. 8B, the only difference from Case I is that carrier 3 has significantly lower power. Based on equation (4), SINRs of carrier 5 and carrier 7 may be given as follows.
Case A: 31.7 dB, 39.7 dB
Case B: 30.1 dB, 30.1 dB
Case C: 26.7 dB, 31.7 dB If interested in maximizing minimum SINR, Case A may be the preferred configuration of receiver 209 under this interference condition, because Case B involves even more signals than Case A and Case C (as shown in FIGS. 5A-C, 6A-C, and 7A-C), and because Case A causes interference from carrier 3 that is weaker than carrier 9 from which Case C causes the interference.

It is worth noting that increasing/maximizing minimum SINR is only one example of embodiments of the present invention. There may be many other methods with cost functions that take SINR values as input arguments. For example, maximization of average SINR either in dB scale or in linear scale may be used. If the throughput is taken as the cost function (which is often the case for mobile broadband systems), it may be possible to select a receiver configuration that increases/maximizes a sum throughput (i.e., a summation of throughput over all the carriers). For instance, SINR values may be calculated for each receiver configuration as illustrated in the previous example, and then, based on the SINR values, modulation and coding scheme may be calculated for each receiver configuration. In this way, it may be possible to predict the throughput of candidate receiver configurations and select the configuration with increased/maximum sum throughput. The use of throughput as cost function may be particularly useful when the carriers have different bandwidths.

As shown in this example, the receiver configuration may be adapted based on the interference condition to mitigate a level of interference. Stated in other words, a fixed receiver configuration (or careless selection of receiver configuration) may lead to higher interference levels. Performance loss relative to an optimal receiver configuration may increase with increased numbers of RF carriers (e.g., RF component carriers) being received simultaneously. Stated in other words, it is expected that gain of an adaptive receiver configuration may increase when more than two carriers are to be received simultaneously.

It is also worth mentioning impact on CQI (Channel Quality Information) reporting. For example, if RAN 60 requires UE 200 to report CQI (e.g., the modulation and coding scheme to the eNB 100 in LTE DL), the configuration of receiver 209 may be the same for both CQI report and actual data transmission. For example, processor 215 of UE 200 may measure/calculate SNRs (signal-to-noise ratios) for Cases A, B, and C in the n$^{th}$ subframe and may select Case A that increases/maximizes the cost function. Then, UE 200 may report the corresponding modulation and coding scheme back to eNB 100. In the following subframe (e.g., (n+8)$^{th}$ subframe), eNB 100 may send actual data to UE 200 using the aforementioned modulation and coding scheme. Therefore, UE 200 may be configured according to Case A in the (n+8)$^{th}$ subframe. Otherwise, if UE 200 has receiver configuration of Case B in the (n+8)$^{th}$ subframe, the channel quality may be either over-estimated or under-estimated because the modulation and coding scheme is not based on the actual SNR of the subframe that it is intended for.

It can be understood that the calculation of interference level may be relatively simple (as shown in equation (4)), but the calculation may require knowledge of power levels as well as receiver parameters related to IQ imbalance and harmonic mixing. As used herein, estimating noise and/or interference may include estimating power levels of desired signals and noise and/or interference of all relevant carriers.

The power levels of adjacent carriers can be estimated regularly or irregularly and stored for the future use. If a band selection filter is used (as in the previous example), only the carriers within the same band need to be measured. If it is difficult/impossible to estimate the power levels frequently, the interference mitigation can be based on long-term statistics rather than instantaneous interference conditions. The power level estimated during conventional cell search can be reused for the purpose of interference mitigation.

IQ imbalance parameters can also be estimated regularly or irregularly, as discussed for example, by Tarighat, et al., "Compensation schemes and performance analysis of IQ imbalances in OFDM receivers", IEEE Trans. Signal Processing, vol. 53, no. 8, pp. 3257-3268, August 2005, the disclosure of which is hereby incorporated herein in its entirety by reference.

IQ imbalance parameters can be calculated offline from the architecture of RF mixing and the expected gain and phase imbalance. In case IQ Imbalance is compensated, the effective image rejection ratio is used. The harmonic mixing parameters may also be estimated, or, they may be calculated offline from the architecture of harmonic rejection mixer and the expected gain and phase imbalance as discussed, for example, by Weldon et ah, "A 1.75-GHz highly integrated narrow-band CMOS transmitter with harmonic-rejection mixers", IEEE JSSC, vol. 36, pp. 2003-2015, December 2001, the disclosure of which is hereby incorporated herein in its entirety by reference. While some examples of this disclosure may consider only IQ imbalance and harmonic mixing as impairment factors that cause interference, embodiments of the present invention may also be applied to other impairment factors, for example, if the relevant interference level(s) can be calculated based on the power levels (and the related receiver parameters).

Embodiments of the present invention have been discussed above with respect to FIGS. 2 and 3. Power levels and receiver parameters may be measured at UE 200 and stored to a storage device such as register 222 and/or memory 220. For example, estimates of power levels and receiver parameters may be stored in register 222, and instructions for selection of receiver configurations may be stored in memory 219 and implemented by processor 215. The receiver configuration may include RF mixer frequency $f_{RF}$, the IF mixer frequency $f_{IF}$, and selection of inputs for switches 307a-d (e.g., to select receiver a architecture for each carrier). The RF mixer frequency may often be used as the representative of receiver configuration because the IF mixer frequency and receiver architecture can be determined from fee RF mixer frequency. Processor 215 may calculate an interference level of each receiver configuration, based on the power levels and receiver parameters. A desired/optimal receiver configuration may be selected by processor 215, and based on the selection, processor 215 may control RF-LO 208, IF-LO 208, and switches 307a-d to provide the selected configuration. Processor 215, for example, may be implemented as hardware and/or software (u-controller).

Some embodiments of the present invention may provide one or more of the following advantages. For example, levels of interference may be mitigated by adapting receiver configurations including RF mixing frequencies, IF mixing frequencies, and receiver architectures. Receiver design requirements may be relaxed because interference caused by circuit impairment such as IQ imbalance and harmonic mixing may be reduced. Cost function calculations may be relatively simple (depending on definition of the cost function) so that it may be possible to implement embodiments of the invention in real time and/or in software. Embodiments of the present invention may also help avoid interference-limited receiver configurations without/before actually changing the configuration and/or experiencing performance loss.

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

What is claimed is:

1. A method of simultaneously receiving first and second radio frequency (RF) carriers over respective first and second RF carrier frequencies, the method comprising;
    providing the first and second RF carriers at an RF mixer stage;
    downconverting the first and second RF carriers through the RF mixer stage using a first RF mixer frequency during a first time period to generate first downconverted signals;
    processing the first downconverted signals during the first time period to provide first and second DC carriers corresponding to the first and second RF carriers;
    downconverting the first and second RF carriers through the RF mixer stage using a second RF mixer frequency during a second time period to generate second downconverted signals, wherein the first and second RF mixer frequencies are different; and
    processing the second downconverted signals during the second time period to provide the first and second DC carriers corresponding to the first and second RF carriers.

2. A method according to claim 1 wherein each of the first and second RF mixer frequencies is between the first and second RF carrier frequencies, is equal to the first RF carrier frequency, or is equal to the second RF carrier frequency.

3. A method according to claim 1 wherein the first RF mixer frequency is between the first and second RF carrier frequencies, and wherein the second RF mixer frequency is equal to the first RF carrier frequency.

4. A method according to claim 1,
    wherein processing the first downconverted signals during the first time period comprises,
        downconverting the first downconverted signals through an IF mixer stage using a first intermediate frequency (IF) mixer frequency to generate the first and second DC carriers at DC, and
    wherein processing the second downconverted signals during the second time period comprises,
        downconverting the second downconverted signals through the IF mixer stage using a second intermediate frequency (IF) mixer frequency to generate the second DC carrier at DC corresponding to the second RF carrier, and
        processing the second downconverted signals without IF mixing to generate the first DC carrier at DC corresponding to the first RF carrier.

5. A method according to claim 4 wherein the first RF mixer frequency is equal to an average of the first and second RF carrier frequencies, wherein the second RF mixer frequency is equal to the first RF carrier frequency of the first RF carrier, wherein the first IF mixer frequency is equal to half of a difference between the first and second RF carrier frequencies of the first and second RF carriers, and wherein the second IF mixer frequency is equal to a difference between the first and second RF carrier frequencies of the first and second RF carriers.

6. A method according to claim 1 further comprising:
downconverting the first and second RF carriers through the RF mixer stage using a third RF mixer frequency during a third time period to generate third downconverted signals; and
processing the third downconverted signals during the third time period to provide the first and second DC carriers corresponding to the first and second RF carriers.

7. A method according to claim 6,
wherein processing the first downconverted signals during the first time period comprises downconverting the first downconverted signals through an IF mixer stage using a first intermediate frequency (IF) mixer frequency to generate the first and second DC carriers at DC,
wherein processing the second downconverted signals during the second time period comprises downconverting the second downconverted signals through the IF mixer stage using a second intermediate frequency (IF) mixer frequency to generate the second DC carrier at DC corresponding to the second RF carrier, and processing the second downconverted signals without IF mixing to generate the first DC carrier at DC corresponding to the first RF carrier, and
wherein processing the third downconverted signals during the third time period comprises downconverting the third downconverted signals through the IF mixer stage using a third intermediate frequency (IF) mixer frequency to generate the first DC carrier at DC corresponding to the first RF carrier, and processing the third downconverted signals without IF mixing to generate the second DC carrier at DC corresponding to the second RF carrier.

8. A method according to claim 7 wherein the first RF mixer frequency is equal to an average of the first and second RF carrier frequencies of the first and second RF carriers, wherein the second RF mixer frequency is equal to the first RF carrier frequency of the first RF carrier, wherein the third RF mixer frequency is equal to the second RF carrier frequency of the second RF carrier, wherein the first IF mixer frequency is equal to half of a difference between the first and second RF carrier frequencies of the first and second RF carriers, and wherein each of the second and third IF mixer frequencies is equal to a difference between the first and second RF carrier frequencies of the first and second RF carriers.

9. A method according to claim 1 further comprising:
converting the first and second DC carriers from analog signals to digital signals;
processing the digital signals to generate data streams corresponding to the first and second RF carriers; and
providing information through a user interface responsive to the data streams.

10. A method according to claim 1
wherein downconverting during the first time period using the first RF mixer frequency is preceded by,
providing an estimate of noise and/or interference for the first time period,
providing first calculations of performance metrics for downconverting and processing the first and second RF carriers using the first and second RF mixer frequencies responsive to the estimate of noise and/or interference for the first time period, and
selecting the first RF mixer frequency responsive to the first calculations of performance metrics, and
wherein downconverting during the second time period using the second RF mixer frequency is preceded by,
providing an estimate of noise and/or interference for the second time period,
providing second calculations of performance metrics for downconverting and processing the first and second RF carriers using the first and second RF mixer frequencies responsive to the estimate of noise and/or interference for the second time period, and
selecting the second RF mixer frequency responsive to the second calculations of performance metrics.

11. A communications device configured to simultaneously receive first and second radio frequency (RF) carriers over respective first and second RF carrier frequencies, the receiver comprising;
an RF mixer stage configured to downconvert the first and second RF carriers using a first RF mixer frequency during a first time period to generate first downconverted signals, and to downconvert the first and second RF carriers using a second RF mixer frequency during a second time period to generate second downconverted signals, wherein the first and second RF mixer frequencies are different; and
an intermediate frequency (IF) mixer stage configured to process the first downconverted signals during the first time period to provide first and second DC carriers corresponding to the first and second RF carriers during the first time period, and to process the second downconverted signals during the second time period to provide the first and second DC carriers corresponding to the first and second RF carriers during the second time period.

12. A communications device according to claim 11 wherein each of the first and second RF mixer frequencies is between the first and second RF carrier frequencies, is equal to the first RF carrier frequency, or is equal to the second RF carrier frequency.

13. A communications device according to claim 11 wherein the first RF mixer frequency is between the first and second RF carrier frequencies, and wherein the second RF mixer frequency is equal to the first RF carrier frequency.

14. A communications device according to claim 11,
wherein the IF mixer stage is configured to process the first downconverted signals during the first time period by downconverting the first downconverted signals using a first IF mixer frequency to generate the first and second DC carriers at DC, and
wherein the IF mixer stage is configured to process the second downconverted signals during the second time period by
downconverting the second downconverted signals using a second intermediate frequency (IF) mixer frequency to generate the second DC carrier at DC corresponding to the second RF carrier, and
processing the second downconverted signals without IF mixing to generate the first DC carrier at DC corresponding to the first RF carrier.

15. A communications device according to claim 14 wherein the first RF mixer frequency is equal to an average of the first and second RF carrier frequencies, wherein the second RF mixer frequency is equal to the first RF carrier frequency of the first RF carrier, wherein the first IF mixer frequency is equal to half of a difference between the first and second RF carrier frequencies of the first and second RF carriers, and wherein the second IF mixer frequency is equal to a difference between the first and second RF carrier frequencies of the first and second RF carriers.

16. A communications device according to claim 11,
wherein the RF mixer stage is further configured to downconvert the first and second RF carriers using a third RF mixer frequency during a third time period to generate third downconverted signals; and
wherein the IF mixer stage is further configured to process the third downconverted signals during the third time period to the first and second DC carriers corresponding to the first and second RF carriers.

17. A communications device according to claim 16,
wherein the IF mixer stage is configured to process the first downconverted signals during the first time period by downconverting the first downconverted signals through an IF mixer stage using a first intermediate frequency (IF) mixer frequency to generate the first and second DC carriers at DC,
wherein the IF mixer stage is configured to process the second downconverted signals during the second time period by downconverting the second downconverted signals through the IF mixer stage using a second intermediate frequency (IF) mixer frequency to generate the second DC carrier at DC corresponding to the second RF carrier, and processing the second downconverted signals without IF mixing to generate the first DC carrier at DC corresponding to the first RF carrier, and
wherein the IF mixer stage is configured to process the third downconverted signals during the third time period by downconverting the third downconverted signals through the IF mixer stage using a third intermediate frequency (IF) mixer frequency to generate the first DC carrier at DC corresponding the first RF carrier, and processing the third downconverted signals without IF mixing to generate the second DC carrier at DC corresponding to the second RF carrier.

18. A communications device according to claim 17 wherein the first RF mixer frequency is equal to an average of the first and second RF carrier frequencies of the first and second RF carriers, wherein the second RF mixer frequency is equal to the first RF carrier frequency of the first RF carrier, wherein the third RF mixer frequency is equal to the second RF carrier frequency of the second RF carrier, wherein the first IF mixer frequency is equal to half of a difference between the first and second RF carrier frequencies of the first and second RF carriers, and wherein each of the second and third IF mixer frequencies is equal to a difference between the first and second RF carrier frequencies of the first and second RF carriers.

19. A communications device according to claim 11 further comprising:
an analog-to-digital converter coupled to the IF mixer stage wherein the analog-to-digital converter is configured to convert the first and second DC carriers from analog signals to digital signals; and
a processor coupled to the analog-to-digital converter wherein the processor is configured to process the digital signals to generate data streams corresponding to the first and second RF carriers; and
a user interface coupled to the processor wherein the user interface is configured to provide information responsive to the data streams.

20. A communications device according to claim 19,
wherein the processor is configured to provide an estimate of noise and/or interference for the first time period, to provide first calculations of performance metrics for downconverting and processing the first and second RF carriers using the first and second RF mixer frequencies responsive to the estimate of noise and/or interference for the first time period, and to select the first RF mixer frequency responsive to the first calculations of performance medics, and
wherein the processor is configured to provide an estimate of noise and/or interference for the second time period, to provide second calculations of performance metrics for downconverting and processing the first and second RF carriers using the first and second RF mixer frequencies responsive to the estimate of noise and/or interference for the second time period, and to select the second RF mixer frequency responsive to the second calculations of performance metrics.

\* \* \* \* \*

UNITED STATES PATENT AND TRADEMARK OFFICE
CERTIFICATE OF CORRECTION

PATENT NO.        : 8,412,139 B2
APPLICATION NO.   : 12/987841
DATED             : April 2, 2013
INVENTOR(S)       : Park et al.

It is certified that error appears in the above-identified patent and that said Letters Patent is hereby corrected as shown below:

On the Title Page, item (57), under "ABSTRACT", in Column 2, Line 10, delete "earners." and insert -- carriers. --, therefor.

In the Specifications:
In Column 2, Line 14, delete "ail" and insert - - all - -, therefor.

In Column 2, Line 19, delete "condition, implementation," and insert - - condition. Implementation, - -, therefor.

In Column 3, Line 20, delete "((equal" and insert - - (equal - -, therefor.

In Column 3, Line 21, delete "frequencies))" and insert - - frequencies) - -, therefor.

In Column 3, Line 26, delete "thud" and insert - - third - -, therefor.

In Column 3, Line 34, delete "period," and insert - - period - -, therefor.

In Column 3, Line 42, delete "third," and insert - - third - -, therefor.

In Column 3, Line 56, delete "second," and insert - - second - -, therefor.

In Column 4, Line 5, delete "titan" and insert - - than - -, therefor.

In Column 4, Line 6, delete "his;" and insert - - first - -, therefor.

In Column 4, Line 18, delete "die" and insert - - the - -, therefor.

In Column 4, Line 32, delete "period," and insert - - period - -, therefor.

In Column 4, Line 49, delete "second." and insert - - second - -, therefor.

In Column 4, Line 50, delete "second." and insert - - second - -, therefor.

In Column 4, Line 60, delete "die" and insert - - the - -, therefor.

In Column 5, Line 9, delete "RI" and insert - - RF - -, therefor.

Signed and Sealed this
Sixteenth Day of July, 2013

Teresa Stanek Rea
*Acting Director of the United States Patent and Trademark Office*

CERTIFICATE OF CORRECTION (continued)
U.S. Pat. No. 8,412,139 B2

In Column 5, Line 25, delete "Tire" and insert -- The --, therefor.

In Column 5, Line 25, delete "configured," and insert -- configured --, therefor.

In Column 5, Line 25, delete "second," and insert -- second --, therefor.

In Column 5, Line 28, delete "second," and insert -- second --, therefor.

In Column 5, Line 38, delete "tire" and insert -- the --, therefor.

In Column 5, Line 48, delete "tire" and insert -- the --, therefor.

In Column 5, Line 55, delete "second." and insert -- second --, therefor.

In Column 5, Line 57, delete "coupled," and insert -- coupled --, therefor.

In Column 6, Line 4, delete "period," and insert -- period --, therefor.

In Column 6, Line 13, delete "second." and insert -- second --, therefor.

In Column 6, Line 37, delete "an a" and insert -- a --, therefor.

In Column 7, Line 65, delete "LIE 200" and insert -- UE 200 --, therefor.

In Column 8, Line 37, delete "(RE)" and insert -- (RF) --, therefor.

In Column 9, Line 59, delete "LTE 200" and insert -- UE 200 --, therefor.

In Column 9, Line 60, delete "HE 200" and insert -- UE 200 --, therefor.

In Column 9, Line 67, delete "related," and insert -- related --, therefor.

In Column 10, Line 7, delete "desired," and insert -- desired --, therefor.

In Column 10, Line 9, delete "medics" and insert -- metrics --, therefor.

In Column 10, Line 10, delete "based," and insert -- based --, therefor.

In Column 11, Line 16, delete "($f_{RF}$=" and insert -- $f_{RF}$= --, therefor.

In Column 11, Line 19, delete "(ccf$_{RF1}$" and insert -- $f_{RF}$=(ccf$_{RF1}$ --, therefor.

In Column 11, Line 49, delete "fire" and insert -- the --, therefor.

In Column 11, Line 60, delete "earners" and insert -- carriers --, therefor.

In Column 12, Line 47, delete "converted," and insert -- converted --, therefor.

CERTIFICATE OF CORRECTION (continued)
U.S. Pat. No. 8,412,139 B2

In Column 13, Line 8, delete "conditions, interference" and insert - - conditions. Interference - -, therefor.

In Column 14, Line 37, delete "RF:" and insert - - RF - -, therefor.

In Column 15, Line 10, delete "drat" and insert - - that - -, therefor.

In Column 15, Line 15, delete "respectively, in" and insert - - respectively. In - -, therefor.

In Column 16, Line 17, delete "A;" and insert - - A: - -, therefor.

In Column 17, Line 34, delete "Imbalance" and insert - - imbalance - -, therefor.

In Column 17, Line 39, delete "ah," and insert - - al., - -, therefor.

In Column 17, Line 56, delete "memory 219" and insert - - memory 220 - -, therefor.

In Column 17, Line 63, delete "fee" and insert - - the - -, therefor.

In the Claims:

In Column 20, Line 18, in Claim 1, delete "comprising;" and insert - - comprising: - -, therefor.

In Column 22, Line 17, in Claim 11, delete "comprising;" and insert - - comprising: - -, therefor.

In Column 24, Line 31, in Claim 20, delete "medics," and insert - - metrics, - -, therefor.